(12) United States Patent
Toyoda et al.

(10) Patent No.: US 12,286,103 B2
(45) Date of Patent: Apr. 29, 2025

(54) APPARATUS, METHOD, AND COMPUTER PROGRAM FOR OBJECT DETECTION

(71) Applicant: TOYOTA JIDOSHA KABUSHIKI KAISHA, Toyota (JP)

(72) Inventors: Daisuke Toyoda, Tokyo-to (JP); Junya Inada, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

(21) Appl. No.: 17/404,036

(22) Filed: Aug. 17, 2021

(65) Prior Publication Data

US 2022/0055618 A1 Feb. 24, 2022

(30) Foreign Application Priority Data

Aug. 24, 2020 (JP) ................ 2020-141086

(51) Int. Cl.
*G06F 18/24* (2023.01)
*B60W 30/095* (2012.01)
*B60W 40/04* (2006.01)
*B60W 40/105* (2012.01)
*G06V 20/56* (2022.01)

(52) U.S. Cl.
CPC .......... *B60W 30/095* (2013.01); *B60W 40/04* (2013.01); *B60W 40/105* (2013.01); *G06F 18/24* (2023.01); *G06V 20/56* (2022.01); *B60W 2554/4046* (2020.02); *B60W 2554/80* (2020.02)

(58) Field of Classification Search
CPC .. B60W 40/04; B60W 30/095; B60W 40/105; B60W 2554/4046; B60W 2554/80; B60W 50/00; B60W 2050/0001; G06F 18/24; G06V 20/56; G06V 10/764; G06N 3/045
See application file for complete search history.

(56) References Cited

U.S. PATENT DOCUMENTS 6,281,786 B1 *  8/2001 Adachi ................ G01S 13/862
                                              367/909
8,306,514 B1 * 11/2012 Nunally ............ H04M 1/72454
                                              455/418
9,449,509 B2 *  9/2016 Koshizen ............ B60W 30/16
10,424,204 B1 *  9/2019 Han ...................... B60Q 1/48
(Continued)

FOREIGN PATENT DOCUMENTS

JP    2017037528 A    2/2017
JP    2017100608 A    6/2017
(Continued)

*Primary Examiner* — Thomas Ingram
*Assistant Examiner* — Michael J Herrera
(74) *Attorney, Agent, or Firm* — Dickinson Wright, PLLC

(57) ABSTRACT

An apparatus for object detection includes a processor configured to detect an object around a vehicle by inputting a sensor signal into a classifier. The sensor signal is obtained by at least one sensor for sensing the situation around the vehicle, and the sensor is mounted on the vehicle. The processor is further configured to set the degree of omission of computation so that at least part of computation on the sensor signal by the classifier will be omitted when the speed of the vehicle is not greater than a predetermined speed threshold and the situation around the vehicle does not correspond to any of predetermined exceptional situations.

8 Claims, 7 Drawing Sheets

(56) References Cited

U.S. PATENT DOCUMENTS

| | | | | |
|---|---|---|---|---|
| 10,671,068 B1* | 6/2020 | Xu | | G06N 20/10 |
| 11,348,269 B1* | 5/2022 | Ebrahimi Afrouzi | | A47L 11/4025 |
| 11,879,978 B1* | 1/2024 | Das | | G01S 17/58 |
| 11,919,518 B2* | 3/2024 | Lu | | B60W 30/18163 |
| 2005/0225636 A1* | 10/2005 | Maemura | | H04N 7/181 |
| | | | | 348/E7.086 |
| 2013/0135118 A1* | 5/2013 | Ricci | | B60K 35/00 |
| | | | | 340/932.2 |
| 2017/0341583 A1* | 11/2017 | Zhang | | B60R 1/00 |
| 2018/0004213 A1* | 1/2018 | Absmeier | | B60W 10/10 |
| 2018/0272963 A1* | 9/2018 | Meyhofer | | G01S 17/931 |
| 2018/0284221 A1* | 10/2018 | Saito | | G01S 7/40 |
| 2018/0342155 A1* | 11/2018 | Lindholm | | B60W 40/06 |
| 2018/0362028 A1* | 12/2018 | Prokhorov | | B62D 15/0255 |
| 2019/0145765 A1* | 5/2019 | Luo | | G06V 10/764 |
| | | | | 702/153 |
| 2019/0147372 A1* | 5/2019 | Luo | | G06N 20/00 |
| | | | | 706/20 |
| 2019/0168664 A1* | 6/2019 | Tatara | | B60Q 5/006 |
| 2019/0297326 A1* | 9/2019 | Reda | | G06T 5/20 |
| 2020/0055515 A1* | 2/2020 | Herman | | G06N 3/047 |
| 2020/0058106 A1* | 2/2020 | Lazarus | | G06V 10/82 |
| 2020/0172106 A1* | 6/2020 | O'Dea | | G06V 20/584 |
| 2020/0209869 A1 | 7/2020 | Toyoura et al. | | |
| 2020/0225673 A1* | 7/2020 | Ebrahimi Afrouzi | | G05D 1/0044 |
| 2020/0410337 A1* | 12/2020 | Huang | | G06N 3/04 |
| 2021/0125313 A1* | 4/2021 | Bai | | G06V 10/806 |
| 2021/0150230 A1* | 5/2021 | Smolyanskiy | | G06V 20/56 |
| 2021/0232208 A1 | 7/2021 | Schirmer et al. | | |
| 2021/0276472 A1* | 9/2021 | Banninga | | B60P 1/283 |
| 2021/0407045 A1* | 12/2021 | Mironica | | G06T 3/40 |
| 2022/0157041 A1* | 5/2022 | Han | | G06V 10/454 |
| 2023/0339494 A1* | 10/2023 | Hack | | B62J 50/21 |

FOREIGN PATENT DOCUMENTS

| | | |
|---|---|---|
| JP | 2018036796 A | 3/2018 |
| WO | 2019058720 A1 | 3/2019 |
| WO | 2019243029 A1 | 12/2019 |

* cited by examiner

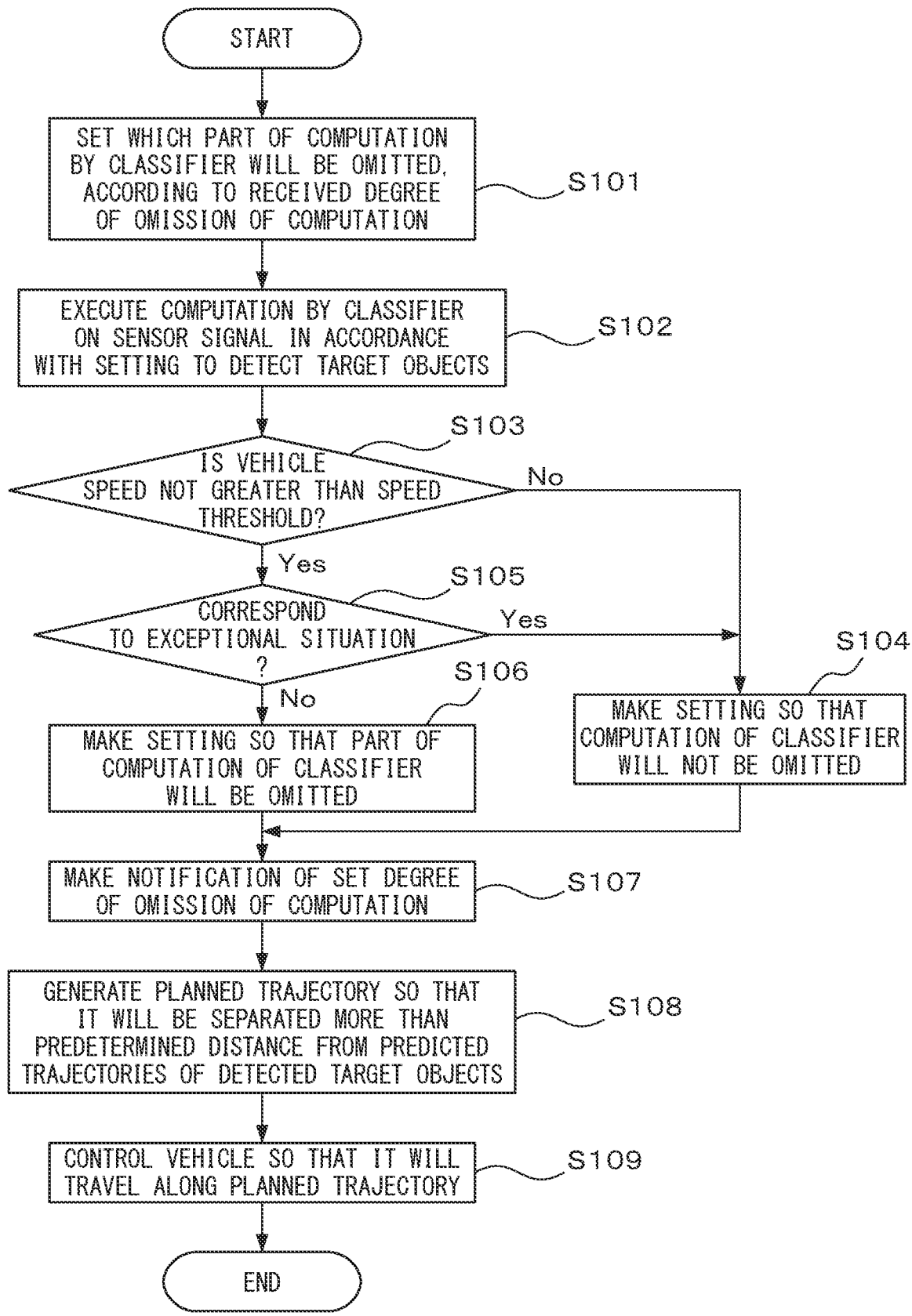

APPARATUS, METHOD, AND COMPUTER PROGRAM FOR OBJECT DETECTION

FIELD

The present invention relates to an apparatus, a method, and a computer program for detecting an object around a vehicle from a sensor signal obtained by a sensor mounted on the vehicle.

BACKGROUND

Techniques to detect an object represented in a sensor signal, such as an image, have been researched. In recent years, to detect an object, techniques to improve the accuracy of detection with a "deep neural network" (hereafter simply a "DNN") have been proposed. However, since the amount of computation of a DNN is enormous, a computer mounted on a vehicle, such as an electronic control unit, is under a heavy processing load when using such a classifier to execute an object detection process. Thus, techniques to adjust an acquisition cycle of information to be processed or detail of processing to be applied according to the circumstances have been proposed (see, e.g., International Publication No. 2019/058720 and Japanese Unexamined Patent Publication No. 2018-36796).

For example, in a technique disclosed in International Publication No. 2019/058720, sensor analysis information is generated by input of output information from a sensor; an action plan is generated by input of the sensor analysis information; and output from the sensor is adjusted to an optimal sensor rate calculated based on at least one of the sensor analysis information and action plan information. In this technique, the sensor analysis information includes the presence or absence of an obstacle in a travel direction, whether clearance sufficient for travel is left, the presence or absence of a blind spot in the travel direction, and whether a moving object is detected. When there is an obstacle, no clearance, or a blind spot in the travel direction or a moving object is detected, the sensor rate is set high. In this technique, the sensor rate is set high at dangerous places such as an intersection, a crosswalk, and a junction.

Japanese Unexamined Patent Publication No. 2018-36796 discloses a technique to process pieces of outside information on surroundings of a host vehicle according to priorities. In this technique, a process is selected according to priorities from a process group including a normal process and a simple process. In the normal process, an integral process on pieces of outside information is executed whereas in the simple process, the integral process is not executed. The priorities are determined depending on at least one of the distance between the host vehicle and a detection target object and the speed of the target relative to the host vehicle.

SUMMARY

However, a change in the acquisition cycle of sensor signals to be processed from a sensor mounted on a vehicle or in the detail of processing on the sensor signals may lead to failure of obtaining the sensor signals at appropriate timing or executing appropriate processing on the sensor signals. This may result in compromising safety of the vehicle. Thus, it is desirable to reduce the amount of computation required to detect an object around the vehicle without compromising safety of the vehicle.

It is an object of the present invention to provide an apparatus for object detection that ensures the safety of a vehicle and can reduce the amount of computation required to detect an object around the vehicle.

According to an embodiment, an apparatus for object detection is provided. The apparatus includes a processor configured to detect an object around a vehicle by inputting a sensor signal into a classifier. The sensor signal is obtained by at least one sensor mounted on the vehicle for sensing the situation around the vehicle. The processor is further configured to set the degree of omission of computation so that at least part of computation on the sensor signal by the classifier will be omitted when the speed of the vehicle is not greater than a predetermined speed threshold and the situation around the vehicle does not correspond to a first situation in which the number of objects around the vehicle is not less than a predetermined number, a second situation in which the distance between the vehicle and an object around the vehicle is not greater than a predetermined distance, a third situation in which the speed of an object around the vehicle relative to the vehicle is not less than a predetermined threshold, a fourth situation in which the vehicle is stuck in a traffic jam, nor a fifth situation in which the vehicle is stopped beyond a stop line. The processor omits part of computation on the sensor signal by the classifier according to the set degree of omission of computation.

In the apparatus, when the speed of the vehicle is not greater than the predetermined speed threshold and the situation around the vehicle corresponds to the fourth or the fifth situation but does not correspond to any of the first to the third situations, the processor preferably sets the degree of omission of computation so that the cycle in which the sensor signal is inputted into the classifier will be longer than the cycle for the case that the speed of the vehicle is greater than the predetermined speed threshold.

In the apparatus, the at least one sensor preferably includes a first sensor that outputs a first sensor signal and a second sensor that has a shorter sensing range than the first sensor and that outputs a second sensor signal. When the speed of the vehicle is not greater than the predetermined speed threshold and the situation around the vehicle corresponds to one of the first or the third to the fifth situations but does not correspond to the second situation, the processor preferably sets the degree of omission of computation so that the first sensor signal obtained by the first sensor will be inputted into the classifier and that the second sensor signal obtained by the second sensor will not be inputted into the classifier.

Alternatively, in the apparatus, when the speed of the vehicle is not greater than the predetermined speed threshold and the situation around the vehicle corresponds to the fifth situation but does not correspond to any of the first to the fourth situations, the processor preferably sets the degree of omission of computation so that only part of the sensor signal corresponding to part of surroundings of the vehicle represented by the sensor signal will be inputted into the classifier.

Alternatively, in the apparatus, the classifier preferably includes a first classifier and a second classifier that detects an object around the vehicle with lower accuracy and with a smaller amount of computation than the first classifier. When the speed of the vehicle is greater than the predetermined speed threshold, the processor preferably sets the degree of omission of computation so that the sensor signal will be inputted into the first classifier. When the speed of the vehicle is not greater than the predetermined speed threshold and the situation around the vehicle corresponds to the fourth or the fifth situation but does not correspond to any of the first to the third situations, the processor preferably sets the degree of omission of computation so that the sensor signal will be inputted into the second classifier.

Alternatively, in the apparatus, when the speed of the vehicle is not greater than the predetermined speed threshold and the situation around the vehicle corresponds to the fourth or the fifth situation but does not correspond to any of the first to the third situations, the processor preferably sets the degree of omission of computation so that part of computation of the classifier itself will be omitted.

Additionally, in the apparatus, the processor preferably detects the state or behavior of the object around the vehicle, based on the sensor signal obtained after the state or behavior of the object around the vehicle causes the vehicle to stop and thereby the processor sets the degree of omission of computation so that at least part of computation on the sensor signal by the classifier will be omitted. The processor preferably determines whether the cause of the stop of the vehicle has been removed, based on the detected state or behavior of the object around the vehicle; and when the cause has been removed, even if the speed of the vehicle is not greater than the predetermined speed threshold, preferably resets the degree of omission of computation so that computation on the sensor signal by the classifier will not be omitted.

According to another embodiment, a method for object detection is provided. The method includes detecting an object around a vehicle by inputting a sensor signal into a classifier. The sensor signal is obtained by at least one sensor mounted on the vehicle for sensing the situation around the vehicle. The method further includes setting the degree of omission of computation so that at least part of computation on the sensor signal by the classifier will be omitted when the speed of the vehicle is not greater than a predetermined speed threshold and the situation around the vehicle does not correspond to a first situation in which the number of objects around the vehicle is not less than a predetermined number, a second situation in which the distance between the vehicle and an object around the vehicle is not greater than a predetermined distance, a third situation in which the speed of an object around the vehicle relative to the vehicle is not less than a predetermined threshold, a fourth situation in which the vehicle is stuck in a traffic jam, nor a fifth situation in which the vehicle is stopped beyond a stop line. Detection of the object is executed with part of computation on the sensor signal by the classifier being omitted according to the set degree of omission of computation.

According to still another embodiment, a non-transitory recording medium that stores a computer program for object detection is provided. The computer program includes instructions causing a processor mounted on a vehicle to execute a process including detecting an object around the vehicle by inputting a sensor signal into a classifier. The sensor signal is obtained by at least one sensor mounted on the vehicle for sensing the situation around the vehicle. The process further includes setting the degree of omission of computation so that at least part of computation on the sensor signal by the classifier will be omitted when the speed of the vehicle is not greater than a predetermined speed threshold and the situation around the vehicle does not correspond to a first situation in which the number of objects around the vehicle is not less than a predetermined number, a second situation in which the distance between the vehicle and an object around the vehicle is not greater than a predetermined distance, a third situation in which the speed of an object around the vehicle relative to the vehicle is not less than a predetermined threshold, a fourth situation in which the vehicle is stuck in a traffic jam, nor a fifth situation in which the vehicle is stopped beyond a stop line. Detection of the object is executed with part of computation on the sensor signal by the classifier being omitted according to the set degree of omission of computation.

The apparatus according to the present invention has an advantageous effect of being able to ensure the safety of a vehicle and to reduce the amount of computation required to detect an object around the vehicle.

BRIEF DESCRIPTION OF DRAWINGS

FIG. 7 is an operation flowchart of the vehicle control process including the object detection process.

DESCRIPTION OF EMBODIMENTS

Hereinafter, an apparatus for object detection will be described with reference to the drawings. The apparatus inputs a sensor signal obtained by a sensor mounted on a vehicle into a classifier that has been trained to detect a predetermined detection target object, thereby detecting the predetermined object around the vehicle. To this end, when the speed of the vehicle is not greater than a predetermined speed threshold, the apparatus omits at least part of computation by the classifier. However, even if the speed of the vehicle is not greater than the speed threshold, the apparatus does not omit computation by the classifier when the situation around the vehicle corresponds to a predetermined exceptional situation in which the degree of safety of the vehicle is supposed to be low. In this way, the apparatus aims to ensure the safety of the vehicle and to reduce the amount of computation required to detect an object around the vehicle.

The following describes an example in which the apparatus for object detection is applied to a vehicle control system. In this example, the apparatus executes an object detection process on an image obtained by a camera mounted on a vehicle to detect various objects around the vehicle, such as other vehicles, humans, signposts, or road markings, and executes automated driving control of the vehicle, based on the result of detection.

Figure 1:
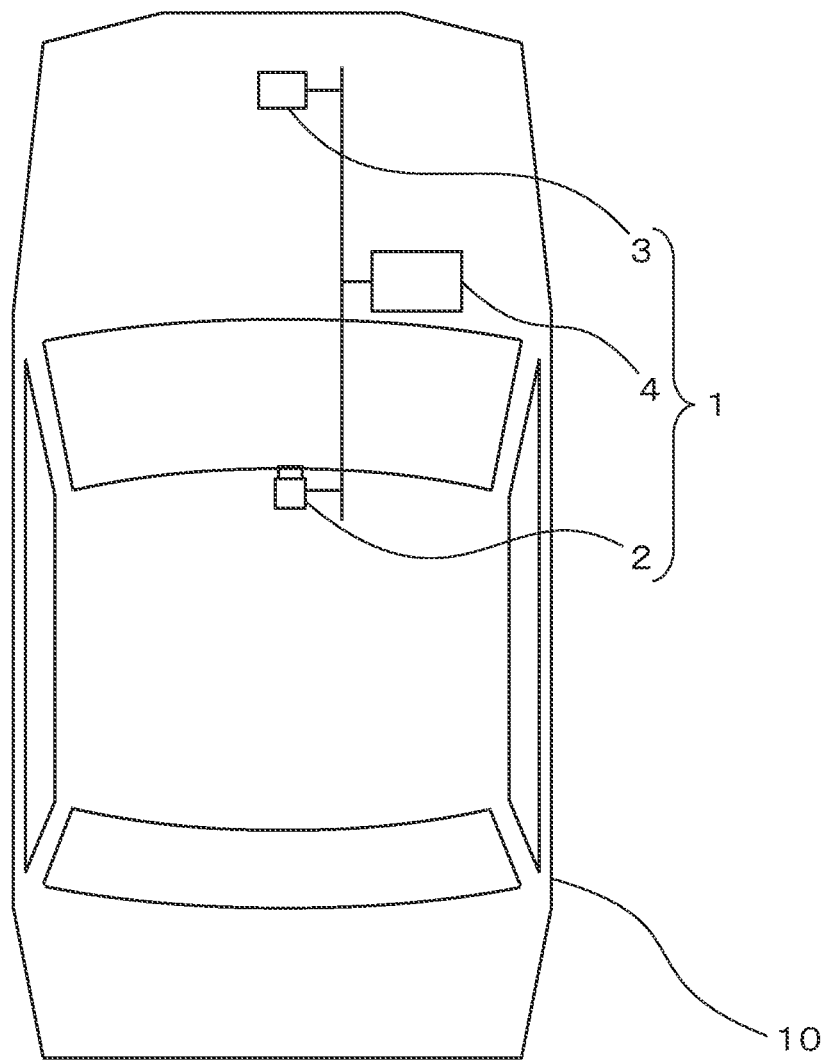
FIG. 1 schematically illustrates the configuration of a vehicle control system including an apparatus for object detection.
Figure 2:
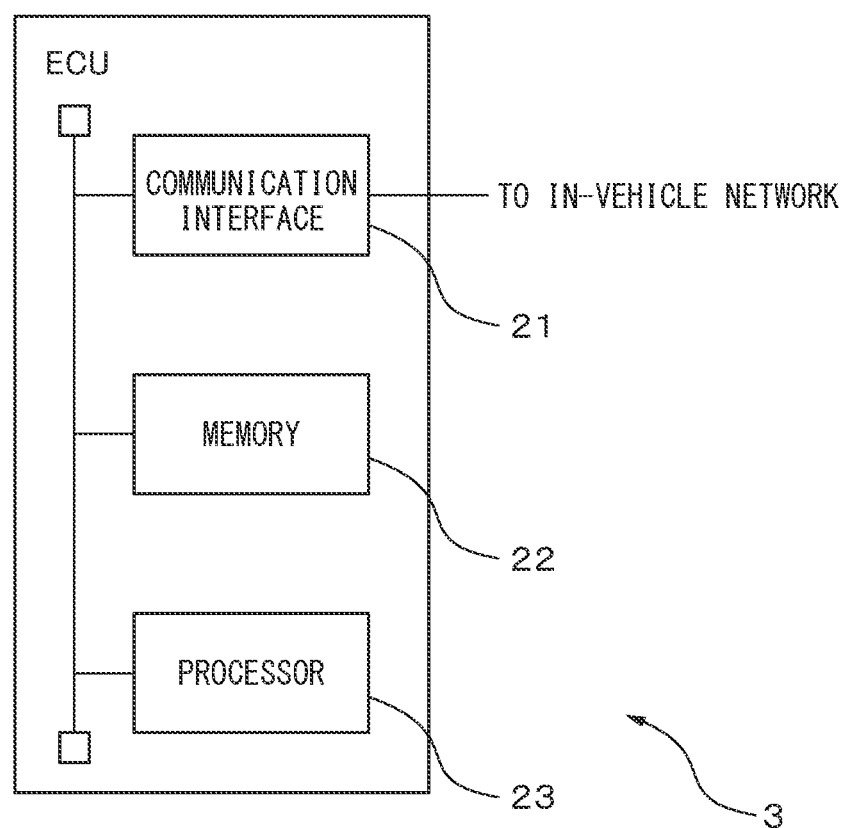
FIG. 2 illustrates the hardware configuration of an electronic control unit, which is an embodiment of the apparatus for object detection.

FIG. 1 schematically illustrates the configuration of a vehicle control system including an apparatus for object detection. FIG. 2 illustrates the hardware configuration of an electronic control unit, which is an embodiment of the apparatus for object detection. In the present embodiment, a vehicle control system 1, which is mounted on a vehicle 10 and controls the vehicle 10, includes a camera 2 for capturing surroundings of the vehicle 10, a range sensor 3, and an electronic control unit (ECU) 4, which is an example of the apparatus for object detection. The camera 2 and the range sensor 3 are connected to the ECU 4 via an in-vehicle network conforming to a standard, such as a controller area network, so that they can communicate with each other. The vehicle control system 1 may further include a storage device (not illustrated) that stores map information used for automated driving control of the vehicle 10. The vehicle control system 1 may further include a receiver for determining the position of the vehicle 10 in conformity with a satellite positioning system, such as a GPS receiver (not illustrated); a wireless communication terminal for wireless communication with another device (not illustrated); and a navigation device for searching for a planned travel route of the vehicle 10 (not illustrated).

The camera 2 is an example of a sensor for sensing the situation around the vehicle 10, and includes a two-dimensional detector constructed from an array of optoelectronic transducers, such as CCD or C-MOS, having sensitivity to visible light and a focusing optical system focusing an image of a target region on the two-dimensional detector. The camera 2 is mounted, for example, in the interior of the vehicle 10 so as to be oriented to the front of the vehicle 10. The camera 2 captures a region in front of the vehicle 10 every predetermined capturing period (e.g., 1/30 to 1/10 seconds), and generates images in which this region is captured. The images obtained by the camera 2, each of which is an example of the sensor signal, may be color or gray images. The vehicle control system 1 may include multiple cameras 2 taking pictures in different orientations or having different angles of view.

Every time the camera 2 generates an image, the camera 2 outputs the generated image to the ECU 4 via the in-vehicle network.

The range sensor 3 is another example of a sensor for sensing the situation around the vehicle 10, and includes, for example, at least one of a LiDAR sensor, radar, and sonar. For each direction, the range sensor 3 measures the distance to an object around the vehicle 10 in the direction at predetermined intervals. Then, the range sensor 3 outputs a ranging signal indicating the distance to an object for each direction to the ECU 4 via the in-vehicle network at predetermined intervals. The ranging signal is another example of the sensor signal.

The ECU 4 controls the vehicle 10. In the present embodiment, the ECU 4 detects an object around the vehicle 10 from time-series images obtained by the camera 2 or time-series ranging signals obtained by the range sensor 3, and controls the vehicle 10 so as to automatically drive the vehicle 10, depending on the detected object. For this purpose, the ECU 4 includes a communication interface 21, a memory 22, and a processor 23. The communication interface 21, the memory 22, and the processor 23 may be separate circuits or a single integrated circuit.

The communication interface 21 is an example of a communication unit, and includes an interface circuit for connecting the ECU 4 to the in-vehicle network. In other words, the communication interface 21 is connected to the camera 2 and the range sensor 3 via the in-vehicle network. Every time the communication interface 21 receives an image from the camera 2, the communication interface 21 passes the received image to the processor 23. Every time the communication interface 21 receives a ranging signal from the range sensor 3, the communication interface 21 passes the received ranging signal to the processor 23. Alternatively, the communication interface 21 passes to the processor 23 data received via the in-vehicle network, such as the map information read from the storage device and positioning information from the GPS receiver.

The memory 22 is an example of a storage unit, and includes, for example, volatile and nonvolatile semiconductor memories. The memory 22 stores a computer program for implementing various processes executed by the processor 23 of the ECU 4. The memory 22 also stores various types of data used in the object detection process, such as images received from the camera 2, ranging signals received from the range sensor 3, a set of parameters for specifying a classifier used in the object detection process, and various parameters used for setting the degree of omission of computation. Additionally, the memory 22 stores various types of information necessary for automated driving control of the vehicle 10 and results of computation obtained during the object detection process.

The processor 23 is an example of a control unit, and includes one or more central processing units (CPUs) and a peripheral circuit thereof. The processor 23 may further include another operating circuit, such as a logic-arithmetic unit, an arithmetic unit, or a graphics processing unit. Every time the processor 23 receives an image from the camera 2 during travel of the vehicle 10, the processor 23 executes a vehicle control process including the object detection process on the received image. The processor 23 controls the vehicle 10 so as to automatically drive the vehicle 10, depending on a detected object around the vehicle 10.

Figure 3:
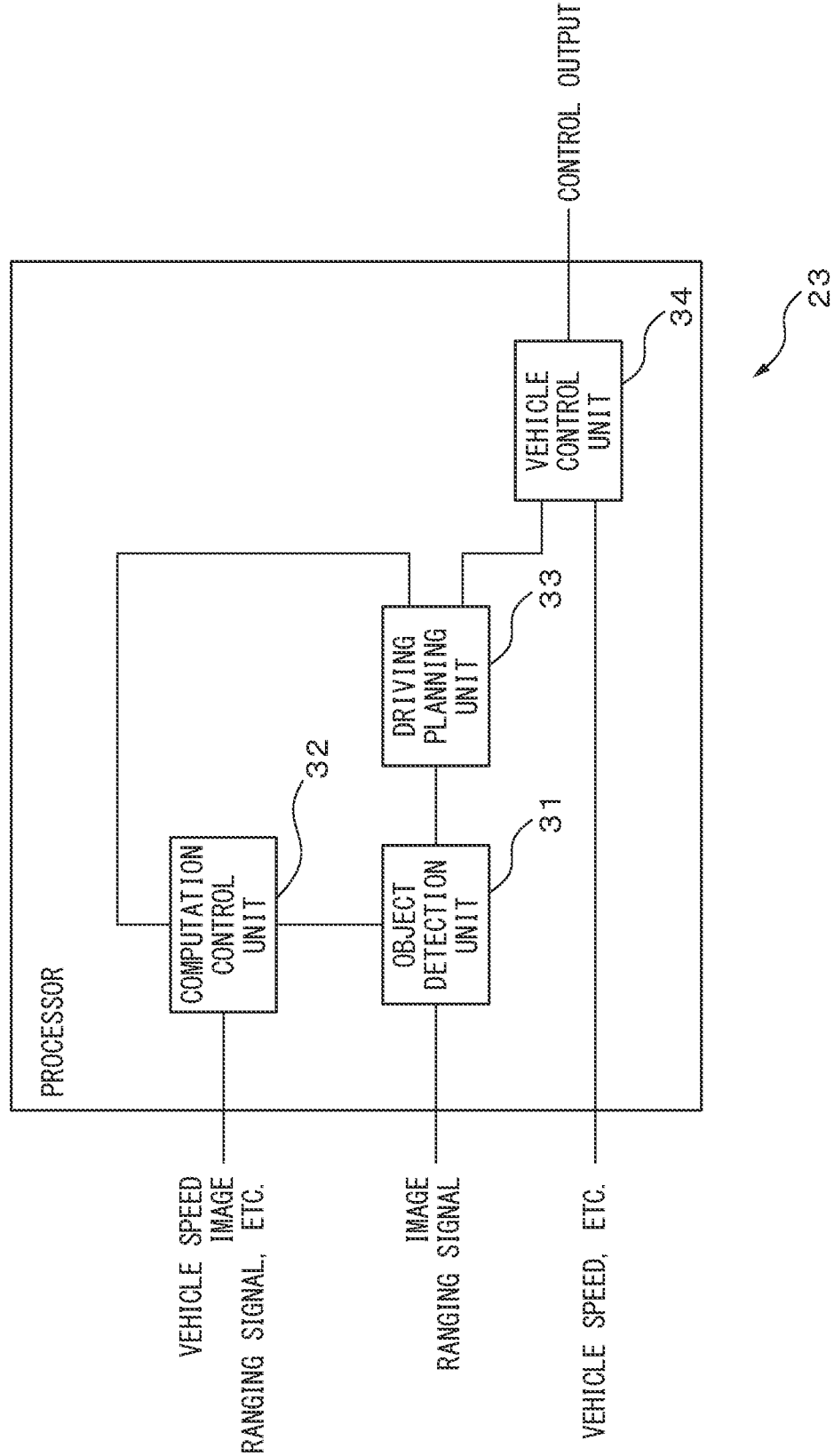
FIG. 3 is a functional block diagram of a processor of the electronic control unit, related to a vehicle control process including an object detection process.

FIG. 3 is a functional block diagram of the processor 23 of the ECU 4, related to the vehicle control process including the object detection process. The processor 23 includes an object detection unit 31, a computation control unit 32, a driving planning unit 33, and a vehicle control unit 34. These units included in the processor 23 are, for example, functional modules implemented by a computer program executed on the processor 23, or may be dedicated operating circuits provided in the processor 23. Of these units included in the processor 23, the object detection unit 31 and the computation control unit 32 execute the object detection process.

The object detection unit 31 inputs, every time the object detection unit 31 obtains an image from the camera 2, the image into a classifier to detect detection target objects around the vehicle 10 represented in the image (hereafter simply "target objects"). The target objects include, for example, a moving object, such as a vehicle or a human. The target objects may further include road markings such as lane lines, signposts such as various regulatory signposts, and stationary objects such as traffic lights.

In the present embodiment, the object detection unit 31 uses, as the classifier, a DNN that has been trained to detect an object region including a target object represented in an image and to identify the type of the target object. The DNN used by the object detection unit 31 may be, for example, a DNN having a convolutional neural network (hereafter simply "CNN") architecture, such as a Single Shot Multi-Box Detector (SSD) or a Faster R-CNN. In this case, the DNN used as the classifier includes, for example, an input layer into which an image is inputted, an output layer to output the result of object detection, and hidden layers connected between the input layer and the output layer. The hidden layers include one or more convolution layers. The hidden layers may further include a layer to execute another type of operation, such as a pooling layer, an upsampling layer, or a fully-connected layer. For each of one or more target objects represented in an inputted image, the classifier outputs information indicating the object region representing the target object (e.g., the position of the upper left edge of the object region and the horizontal and vertical sizes thereof) and information indicating the type of the target object (e.g., vehicle, human, or traffic light). In particular, when the target object is a traffic light, the classifier may output information indicating the lighting state of the traffic light (e.g., a red light or a green light) as the information indicating the type of the target object.

The object detection unit 31 may use a classifier based on another technique, such as an adaBoost or a support vector machine. In this case, the object detection unit 31 calculates a feature, e.g., histograms of oriented gradients (HOG) with respect to a window defined on an image while variously changing the position, size, and aspect ratio of the window, and inputs the calculated feature into the classifier, enabling determination whether a target object is represented in the window.

Additionally, the object detection unit 31 may input a ranging signal obtained by the range sensor 3 into a classifier to detect a target object around the vehicle 10.

In this case, the object detection unit 31 may detect an object around the vehicle 10 in accordance with a technique of object detection depending on the type of the range sensor 3. Alternatively, the object detection unit 31 may input into a DNN not only an image but also a ranging signal obtained by the range sensor 3 and corresponding to the same region as that represented in the image. In this case, the input layer of an image and that of a ranging signal may be provided in the DNN in parallel, or an image and a ranging signal may be inputted into the DNN as different channels. When an image and a ranging signal are inputted into the DNN as different channels, it is preferable to perform registration between the image and the ranging signal so that a pixel of the image and a component of the ranging signal representing the same real-space position will be inputted into the same filter. The object detection unit 31 may perform registration between the image and the ranging signal, based on, for example, the mounted position, the orientation, and the angle of view of the camera 2 and the mounted position of the range sensor 3.

In the present embodiment, the object detection unit 31 omits computation by the classifier according to the degree of omission of computation (hereafter simply referred to as the "degree of omission" in some cases) set by the computation control unit 32, reducing the amount of hardware resource used for the object detection process, of the hardware resource the ECU 4 includes. For example, the degree of omission is set to a degree indicating that part of computation of the classifier will be omitted or a degree indicating that computation of the classifier will not be omitted. However, the degree of omission is not limited thereto, and may be set to one of three or more different degrees of omission of computation of the classifier. Details of setting of the degree of omission will be described below together with the computation control unit 32.

For example, when a degree of omission indicating that part of computation will be omitted is set by the computation control unit 32, the object detection unit 31 omits part of computation by the classifier in accordance with one or more of various techniques to omit computation described below.

For example, the object detection unit 31 may omit part of computation of the classifier itself. For example, when a DNN is used as the classifier, computation of a certain layer included in the DNN may be omitted. For example, the object detection unit 31 may decrease the number of channels included in feature maps obtained in at least one of the convolution layers included in the DNN. This enables the object detection unit 31 to reduce the amount of computation of the classifier itself when the degree of safety of the vehicle 10 is high.

Figure 4:
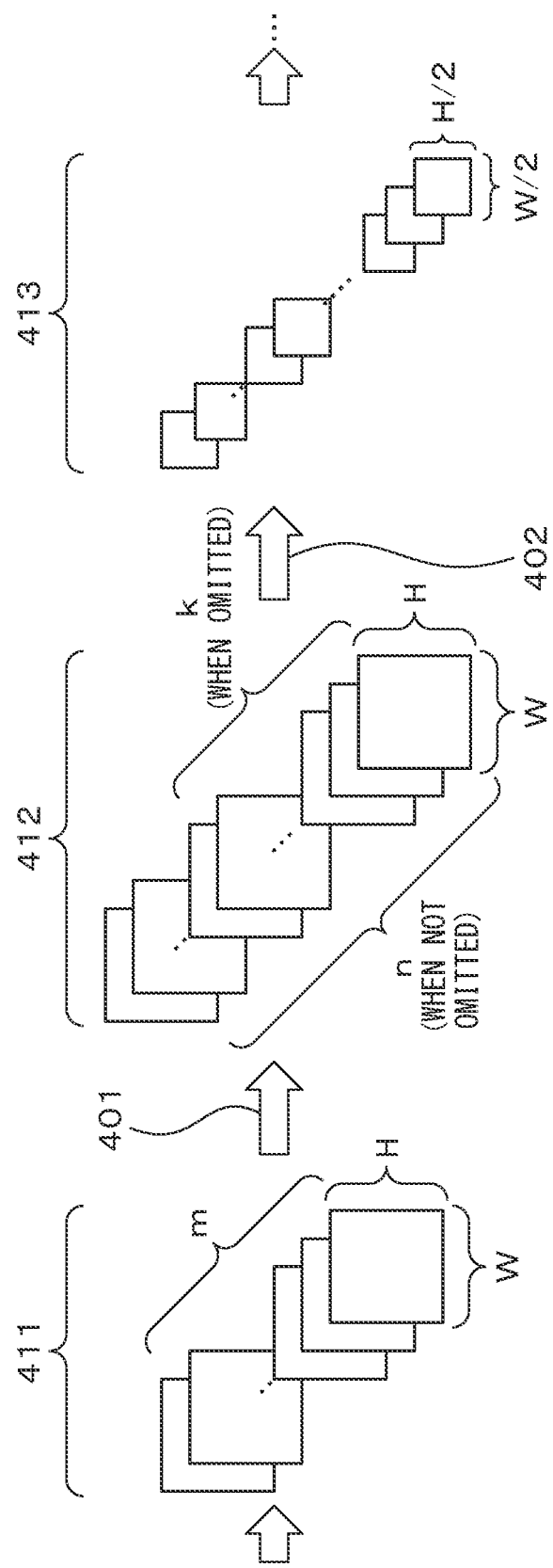
FIG. 4 is a diagram for explaining an example of omission of computation in a classifier.

FIG. 4 is a diagram for explaining an example of omission of computation in a classifier. As illustrated in FIG. 4, a convolution layer 401 included in a DNN used as a classifier executes a convolution operation on feature maps 411 outputted from the layer preceding the convolution layer 401 to generate feature maps 412. The layer 402 next to the convolution layer 401 executes a max pooling operation on the feature maps 412 to output feature maps 413 such that the horizontal and vertical sizes of the channels included in the feature maps 412 are reduced to ½. Further, the layer following the layer 402 executes a predetermined operation on the feature maps 413. The feature maps 411 each have sizes W, H, and m in the horizontal, vertical, and channel directions, respectively, (i.e., a size of W*H*m). When computation by the DNN is not omitted, the convolution layer 401 executes a number, n, of convolution operations in the channel direction on the inputted feature maps 411 so that the feature maps 412 will include a number, n, of feature maps in the channel direction, i.e., so that the size of the feature maps 412 will be (W*H*n). When omission of part of computation of the classifier is set by the computation control unit 32, the convolution layer 401 executes a number, k (k<n), of convolution operations in the channel direction on the inputted feature maps 411. This results in the size of the feature maps 412 generated by the convolution layer 401 being (W*H*k) and a number, (W*H*(n−k)), of convolution operations being omitted. Even if the convolution layer 401 executes only a number, k, of convolution operations in the channel direction, the DNN is preferably trained in advance so as to ensure the minimum required accuracy of detection.

Alternatively, when the set degree of omission indicates omission of part of computation by the classifier, the object detection unit 31 may input only part of a sensor signal into the classifier. For example, the object detection unit 31 limits the detection range to detect a target object. In this case, the object detection unit 31 limits the detection range, for example, to an area such that the distance from the vehicle 10 is not greater than a predetermined distance or an area along the travel direction of the vehicle 10. For this purpose, for example, the object detection unit 31 may input only the region, of an image obtained from the camera 2, corresponding to the set detection range into the classifier. To this end, information indicating the region corresponding to the set detection range may be prestored in the memory 22. For example, a position closer to the vehicle 10 is represented lower in an image. Thus the height from the bottom of an image corresponding to the position where the distance from the vehicle 10 equals the predetermined distance may be prestored in the memory 22. The object detection unit 31 may identify the region of an image lower than this height as the region to be inputted into the classifier. Alternatively, a horizontal range in an image corresponding to the detection range may be set depending on the travel direction of the vehicle 10. For example, when the vehicle 10 travels straight, the object detection unit 31 may identify a region of an image including the horizontal center and having a predetermined width as the region to be inputted into the classifier. When the vehicle 10 turns right, the object detection unit 31 may identify a region of an image having a predetermined width from the right end as the region to be inputted into the classifier. Conversely, when the vehicle 10 turns left, the object detection unit 31 may identify a region of an image having a predetermined width from the left end as the region to be inputted into the classifier. The object detection unit 31 may determine the travel direction of the vehicle 10, based on, for example, a planned travel route of the vehicle 10 set by the navigation device and the current position of the vehicle 10 measured by the GPS receiver. Alternatively, the object detection unit 31 may obtain information on the state of operation of a turn signal from the turn signal or a controller that controls the turn signal via the communication interface 21 to determine the travel direction of the vehicle 10. More specifically, when information indicating that a turn signal is blinking to indicate a right turn is obtained from the turn signal or the controller, the object detection unit 31 may determine that the vehicle 10 will turn right. Conversely, when information indicating that a turn signal is blinking to indicate a left turn is obtained from the turn signal or the controller, the object detection unit 31 may determine that the vehicle 10 will turn left. When information indicating that none of turn signals is blinking is obtained from the turn signals or the controller, the object detection unit 31 may determine that the vehicle 10 will travel along the road on which it is traveling.

Alternatively, the object detection unit 31 may set an area in a sensor signal representing a predetermined object as the detection range. For example, in an image obtained by the camera 2, the object detection unit 31 may set a region representing an object that has caused the vehicle 10 to stop, e.g., a red light or a vehicle traveling ahead of the vehicle 10 (hereafter simply a "leading vehicle") as the detection range.

When the vehicle 10 stops, the positional relationship between the vehicle 10 and an object that has caused the vehicle 10 to stop is supposed to change little from the positional relationship immediately before the vehicle 10 stops. Thus the object detection unit 31 may set the region representing a leading vehicle or a traffic light in the previously obtained sensor signal as the detection range in the latest sensor signal. Alternatively, the object detection unit 31 may apply a prediction filter, such as a Kalman filter, to the result of tracking of a leading vehicle until the preceding signal to predict the region that will represent the leading vehicle in the latest sensor signal, and set the predicted region as the detection range in the latest sensor signal. The object detection unit 31 may obtain information for identifying the object that has caused the vehicle 10 to stop from the driving planning unit 33.

Figure 5:
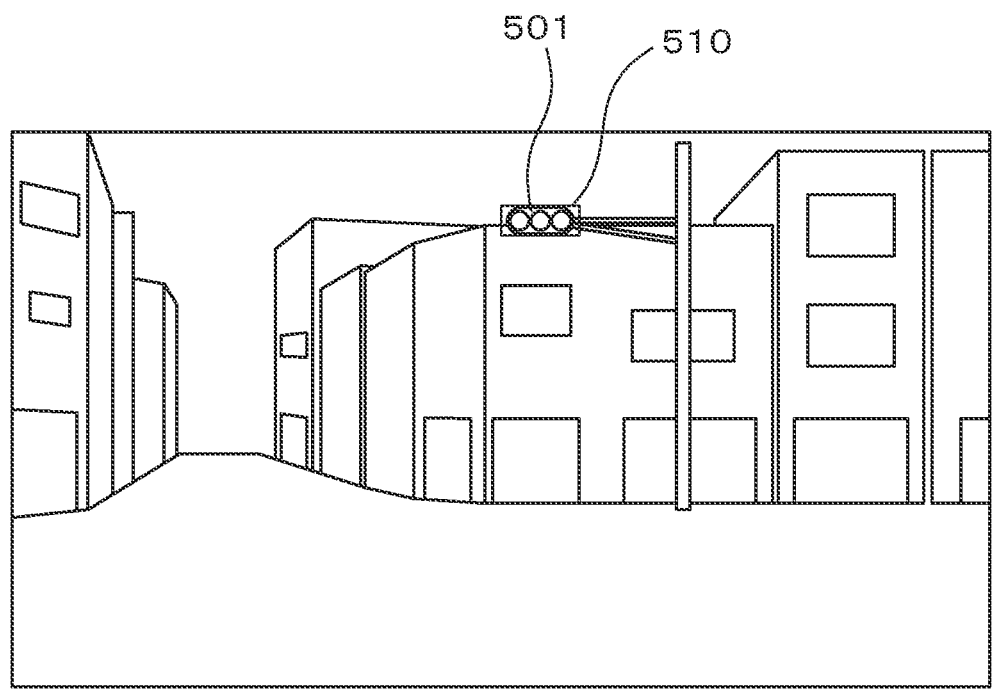
FIG. 5 is a diagram for explaining another example of omission of computation in a classifier.

FIG. 5 is a diagram for explaining another example of omission of computation in a classifier. In this example, it is supposed that the vehicle 10 is stopped because the lighting state of a traffic light 501 ahead of the vehicle 10 is a red light. In this case, only a region 510 representing the traffic light 501 in an image 500 obtained by the camera 2 may be inputted into the classifier. For this purpose, for example, the object detection unit 31 may substitute a predetermined value (e.g., 0) for the values of pixels that are not included in the region 510 in the image 500, and then input the image into the classifier. This results in the classifier executing computation substantially targeted at only the region 510, reducing the amount of computation by the classifier.

Limiting the detection range as described above, the object detection unit 31 can reduce the amount of data to be computed by the classifier, and thus reduce the amount of hardware resource necessary for the object detection process when the degree of safety of the vehicle 10 is high.

As described above, when computation by the classifier is not omitted, the object detection unit 31 may detect a target object, based on sensor signals respectively from multiple sensors mounted on the vehicle 10. In this case, when the set degree of omission indicates omission of at least part of computation by the classifier, the object detection unit 31 may activate only some of the sensors and detect a detection target object around the vehicle 10, based on only sensor signals from the activated sensors. For example, the object detection unit 31 detects a target object around the vehicle 10, based on only an image obtained by the camera 2 or a ranging signal obtained by the range sensor 3. When two cameras having different focal lengths are mounted on the vehicle 10 as the camera 2, the object detection unit 31 may input, for example, only images obtained by one of the two cameras having a shorter focal length, i.e., one capturing the vicinity of the vehicle 10 into the classifier to detect a target object around the vehicle 10. The object detection unit 31 preferably activates only a sensor consuming less power, e.g., the radar or sonar, which is a range sensor 3, and inactivates a sensor consuming more power, e.g., the LiDAR sensor and the camera 2. This further reduces power consumption necessary for the object detection process when the degree of safety of the vehicle 10 is high.

Alternatively, when a degree of omission indicating that part of computation of the classifier will be omitted is set by the computation control unit 32, the object detection unit 31 may extend the cycle in which a sensor signal is inputted into the classifier longer than the cycle for the case that a degree of omission indicating that the computation will not be omitted is set. In this case, the object detection unit 31 may also extend the cycle in which the sensor itself obtains a sensor signal (e.g., the capturing period of the camera 2). For example, when a degree of omission indicating that part of computation of the classifier will be omitted is set, the cycle in which a sensor signal is inputted into the classifier may be set to several 100 ms to 1 s; and when a degree of omission indicating that the computation will not be omitted is set, this input cycle may be set to several 10 ms to 100 ms. This reduces the amount of data to be processed by the classifier per unit time, enabling the object detection unit 31 to reduce the amount of hardware resource necessary for the object detection process when the degree of safety of the vehicle 10 is high.

The higher the set degree of omission of computation, the longer the object detection unit 31 may extend the cycle in which a sensor signal is inputted into the classifier. Then, the higher the degree of safety of the vehicle 10, the more the object detection unit 31 can reduce the amount of hardware resource necessary for the object detection process.

Additionally, as the classifier used by the object detection unit 31 for detecting a target object, two types of classifiers may be prepared, i.e., an accurate classifier that detects a target object with higher accuracy but with a larger amount of computation, and a simple classifier that detects a target object with lower accuracy but with a smaller amount of computation. Both the accurate classifier and the simple classifier may be, for example, DNNs having a CNN architecture. In this case, for example, the accurate classifier and the simple classifier are configured so that the accurate classifier includes more layers than the simple classifier. Alternatively, the accurate classifier and the simple classifier may be configured so that feature maps calculated for at least one of convolution layers included in the accurate classifier have more channels than feature maps calculated for that layer of convolution layers included in the simple classifier which corresponds to the at least one layer. Alternatively, the accurate classifier and the simple classifier may be configured so that the accurate classifier detects a target object from an image itself obtained by the camera 2 and that the simple classifier detects a target object from a reduced image obtained by downsampling an image obtained by the camera 2. In this case, when the degree of omission is set to a degree indicating that part of computation of the classifier will be omitted, the object detection unit 31 may input a sensor signal into the simple classifier to detect a target object; and when the degree of omission is set to a degree indicating that the computation will not be omitted, the object detection unit 31 may input a sensor signal into the accurate classifier to detect a target object.

Additionally, when the degree of omission is set to a degree indicating that part of computation of the classifier will be omitted, the object detection unit 31 may execute a predetermined detection process to detect a particular target object with a small amount of computation, instead of using the simple classifier.

For example, when a traffic light ahead of the vehicle 10 has caused the vehicle 10 to stop, the object detection unit 31 may detect only a change in color in a region representing the traffic light in order to determine whether the lighting state of the traffic light is a red light or a green light. In this case, for example, the object detection unit 31 converts the values of pixels of the region representing the traffic light in the latest image obtained by the camera 2 from the values represented in an RGB colorimetric system to those represented in an HSV colorimetric system, and then calculates the average of hue values of the pixels. Then, the object detection unit 31 may determine that the lighting state of the traffic light is a green light, when the average of hue values is included in a range corresponding to green, and that the lighting state thereof is a red light, when the average of hue values is included in a range corresponding to red. The object detection unit 31 may identify the region representing the traffic light in accordance with a technique similar to that described in relation to limitation of the detection range.

Alternatively, instead of using the simple classifier to detect a target object, the object detection unit 31 may calculate only optical flow in order to monitor the motion of surroundings of the vehicle 10. In this case, the object detection unit 31 may execute, for example, block matching between the latest image obtained by the camera 2 and an image obtained previous to the latest image, thereby calculating optical flow. Then, when the number of blocks whose magnitude of optical flow is not less than a predetermined threshold is not less than a predetermined number, the object detection unit 31 may determine that a vehicle around the vehicle 10 or a leading vehicle has started moving.

The object detection unit 31 outputs information indicating the types of detected target objects and the positions of the target objects in the sensor signal to the computation control unit 32 and the driving planning unit 33.

The computation control unit 32 sets the degree of omission of computation of the classifier executed by the object detection unit 31 according to the degree of safety of the vehicle 10 at predetermined intervals. In the present embodiment, the higher the degree of safety of the vehicle 10, the higher the computation control unit 32 sets the degree of omission of computation. As described above, the degrees of omission of computation include a degree indicating that part of computation of the classifier will be omitted, and a degree indicating that the computation will not be omitted. Thus the computation control unit 32 sets the degree of omission of computation of the classifier according to the degree of safety of the vehicle 10.

For example, when the vehicle 10 is stopped or the speed of the vehicle 10 obtained from a vehicle speed sensor (not illustrated) mounted on the vehicle 10 is not greater than a predetermined speed threshold (e.g., 5 km/h, 10 km/h, or 20 km/h), the computation control unit 32 sets the degree of omission of computation to a degree indicating that part of computation of the classifier will be omitted because the degree of safety of the vehicle 10 is relatively high. When the speed of the vehicle 10 is greater than the predetermined speed threshold, the computation control unit 32 sets the degree of omission of computation to a degree indicating that computation of the classifier will not be omitted because the degree of safety of the vehicle 10 is relatively low.

However, even if the speed of the vehicle 10 is not greater than the predetermined speed threshold, when the situation around the vehicle 10 corresponds to one of the following exceptional situations, it is supposed that the degree of safety of the vehicle 10 is relatively low. In this case, the computation control unit 32 sets the degree of omission of computation to a degree indicating that computation of the classifier will not be omitted.

(Situation 1) A situation in which the number of predetermined objects around the vehicle 10 is not less than a predetermined number. The predetermined objects may be, for example, moving objects other than the vehicle 10, such as other vehicles or humans.

(Situation 2) A situation in which the distance between the vehicle 10 and a predetermined object around the vehicle 10 is not greater than a predetermined distance.

(Situation 3) A situation in which the speed of a predetermined object around the vehicle 10 relative to the vehicle 10 is not less than a predetermined speed difference threshold.

(Situation 4) A situation in which the vehicle 10 is stuck in a traffic jam.

(Situation 5) A situation in which the vehicle 10 is stopped beyond a stop line.

Regarding situation 1, for example, the computation control unit 32 counts the number of predetermined objects around the vehicle 10, based on the result of detection of target objects around the vehicle 10 received from the object detection unit 31. Then, the computation control unit 32 compares the number of predetermined objects with the predetermined number, and determines that the situation around the vehicle 10 corresponds to situation 1, when the number of predetermined objects is not less than the predetermined number. The faster the speed of the vehicle 10, the smaller the computation control unit 32 may make the predetermined number. This enables the computation control unit 32 to more appropriately set the degree of omission of computation.

Figure 6:
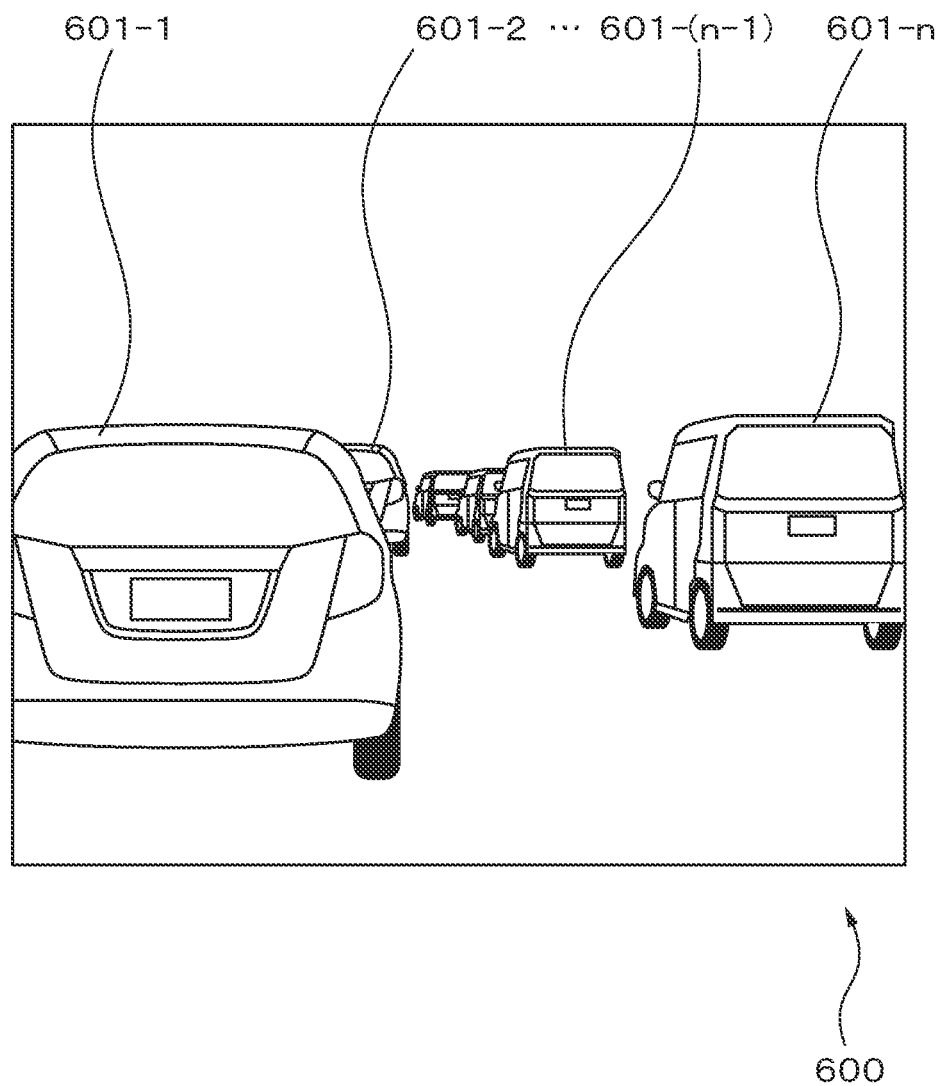
FIG. 6 is a diagram for explaining an example of a situation in which computation by a classifier is not omitted.

FIG. 6 is a diagram for explaining an example of situation 1. As illustrated in FIG. 6, many vehicles are traveling around the vehicle 10. Therefore a number, n, of other vehicles 601-1 to 601-*n* are detected in an image 600 obtained by the camera 2. Thus, when the number, n, of detected vehicles is not less than the predetermined number, it is determined that the situation around the vehicle 10 corresponds to situation 1. In such a situation, it is not preferable to omit computation by the classifier because detection of behavior of the individual vehicles is required to ensure the safety of the vehicle 10. Thus, in such a situation as to be illustrated in FIG. 6, the computation control unit 32 sets the degree of omission of computation to the degree such that computation by the classifier will not be omitted.

Regarding situation 2, for example, the computation control unit 32 measures the distance to each of predetermined objects detected by the object detection unit 31. For example, the position of an object region representing a predetermined object in an image obtained by the camera 2 corresponds one-to-one to the direction to the predetermined object viewed from the camera 2. Thus the computation control unit 32 may use a measured value of the distance in the direction from the range sensor 3, which corresponds to the direction from the camera 2, to the position corresponding to a reference point of an object region representing a predetermined object in an image (e.g., the centroid of the object region) as the distance from the vehicle 10 to the predetermined object.

When a predetermined object is on the same road as the vehicle 10, the position of the bottom of the object region including the predetermined object in an image is assumed to correspond to the position of the predetermined object on the road surface. The computation control unit 32 can identify the direction from the camera 2 to the position of the predetermined object on the road surface, based on the position of the bottom of the object region including the predetermined object in an image. Thus the computation control unit 32 may measure the distance from the vehicle 10 to the predetermined object, based on the mounted position (including the height from the road surface) of the camera 2 stored in the memory 22 and the identified direction from the camera 2 to the position of the predetermined object on the road surface.

For each of the detected predetermined objects, the computation control unit 32 compares the distance from the vehicle 10 to the predetermined object with the predetermined distance. When for one or more of the predetermined objects the distance from the vehicle 10 to the predetermined object is not greater than the predetermined distance, the computation control unit 32 determines that the situation around the vehicle 10 corresponds to situation 2. For example, with reference to FIG. 6 again, when the vehicle 10 is close to the vehicle 601-1 traveling ahead of the vehicle 10, the vehicle 10 may collide with the vehicle 601-1, and thus the degree of safety of the vehicle 10 is not high even if few vehicles are traveling around the vehicle 10. For this reason, when the distance between the vehicle 601-1 and the vehicle 10 is not greater than the predetermined distance, it is determined that the situation around the vehicle 10 corresponds to situation 2. The faster the speed of the vehicle 10, the longer the computation control unit 32 may make the predetermined distance. This enables the computation control unit 32 to appropriately set the degree of omission of computation.

Regarding situation 3, the computation control unit 32 calculates the speed relative to the vehicle 10 for each predetermined object detected by the object detection unit 31. For this purpose, the computation control unit 32 applies, for example, a tracking process based on optical flow, such as the Lucas-Kanade method, to an object region of interest representing a predetermined object of interest in the latest image and the object regions in past images, thereby tracking the predetermined object represented in the object regions. To achieve this, the computation control unit 32 applies, for example, a filter for extracting characteristic points, such as SIFT or Harris operator, to the object region of interest, thereby extracting characteristic points from this object region. Then, the computation control unit 32 identifies those points in the object regions in the past images which correspond to the characteristic points in accordance with the applied tracking technique, thereby calculating the optical flow. Alternatively, the computation control unit 32 may apply another tracking technique applied for tracking a moving object detected from an image to the object region of interest in the latest image and the object regions in the past images, thereby tracking the detection target object represented in the object regions.

For each predetermined object detected by the object detection unit 31, the computation control unit 32 can measure the distance from the vehicle 10 at the time of acquisition of each of sequential images obtained in a preceding predetermined period, by the technique described in relation to situation 2, based on the position of the object region representing the predetermined object in each of the sequential images and identified as a result of the tracking process. Then, the computation control unit 32 can calculate the speed of the predetermined object relative to the vehicle 10 from changes in the distance from the vehicle 10 to the predetermined object at the time of acquisition of each of the sequential images and from the cycle in which the images are obtained. When for one or more of the predetermined objects the speed of the predetermined object relative to the vehicle 10 is not less than the predetermined speed difference threshold, the computation control unit 32 determines that the situation around the vehicle 10 corresponds to situation 3.

Regarding situation 4, the computation control unit 32 determines whether the vehicle 10 is stuck in a traffic jam, based on, for example, the speed of each of other vehicles around the vehicle 10 detected by the object detection unit 31. For example, for each of other vehicles around the vehicle 10, the computation control unit 32 calculates the speed relative to the vehicle 10 in accordance with the technique described in relation to situation 3, and adds the speed of the vehicle 10 to the relative speed to estimate the speed of the vehicle around the vehicle 10. The computation control unit 32 calculates the average of the speed in a preceding predetermined period for each of other vehicles around the vehicle 10, and further averages the averages of the speeds of all the vehicles to calculate the average speed of the vehicles around the vehicle 10 in the preceding predetermined period. When the average speed of the vehicles around the vehicle 10 in the preceding predetermined period is not greater than a predetermined traffic jam determination threshold, the computation control unit 32 determines that the vehicle 10 is stuck in a traffic jam. In other words, the computation control unit 32 determines that the situation around the vehicle 10 corresponds to situation 4.

The computation control unit 32 may calculate, for each lane, the average speed of other vehicles traveling on the lane in a preceding predetermined period. In this case, the computation control unit 32 may identify the lanes on which the vehicles are traveling according to the positional relationship between lane lines detected by the object detection unit 31 and the vehicles in an image obtained by the camera 2. For example, an object region representing a vehicle traveling on the immediate right lane relative to the lane on which the vehicle 10 is traveling (these lanes are hereafter referred to as the "immediate right lane" and the "host vehicle lane," respectively) in an image lies on the right of the lane line dividing the host vehicle lane and the immediate right lane. An object region representing a vehicle traveling on the immediate left lane relative to the host vehicle lane (hereafter, the "immediate left lane") lies on the left of the lane line dividing the host vehicle lane and the immediate left lane. Thus the computation control unit 32 can compare the position of the lane line dividing the host vehicle lane and the immediate right lane with that of the object region representing a vehicle of interest in an image, and determine that the vehicle of interest is traveling on the immediate right lane, when the object region lies on the right of the lane line. Similarly, the computation control unit 32 can compare the position of the lane line dividing the host vehicle lane and the immediate left lane with that of the object region representing a vehicle of interest in an image, and determine that the vehicle of interest is traveling on the immediate left lane, when the object region lies on the left of the lane line. Additionally, the computation control unit 32 can determine that the vehicle of interest is traveling on the host vehicle lane, when the position of the object region representing the vehicle of interest is sandwiched between the lane line dividing the host vehicle lane and the immediate right lane and the lane line dividing the host vehicle lane and the immediate left lane in an image.

Alternatively, the computation control unit 32 may estimate the distance between the vehicle 10 and a vehicle of interest in the direction perpendicular to the travel direction of the vehicle 10 (hereafter, the "lateral distance"), based on the direction and the distance from the vehicle 10 to the vehicle of interest. Then, the computation control unit 32 may compare the estimated lateral distance with the lane width to identify the travel lane of the vehicle of interest. In this case, the computation control unit 32 can determine the lane width by identifying, for example, the road on which the vehicle 10 is traveling from the current position of the vehicle 10 measured by the GPS receiver and from the map information. When the lateral distance is not greater than the lane width, the computation control unit 32 can determine that the vehicle of interest is traveling on the host vehicle lane. When the lateral distance is greater than the lane width and not greater than twice the lane width, the computation control unit 32 can determine that the vehicle of interest is traveling on an adjoining lane. When the lateral distance is greater than twice the lane width and not greater than thrice the lane width, the computation control unit 32 can determine that the vehicle of interest is traveling on the lane opposite to the host vehicle lane with respect to an adjoining lane.

For each lane, the computation control unit 32 measures the average speed of vehicles around the vehicle 10 in the preceding predetermined period. For each lane, the computation control unit 32 compares the average speed of vehicles traveling on the lane with the predetermined traffic jam determination threshold. When the average speed of vehicles is not greater than the predetermined traffic jam determination threshold for a certain lane, the computation control unit 32 may determine that the vehicle 10 is stuck in a traffic jam. In other words, the computation control unit 32 may determine that the situation around the vehicle 10 corresponds to situation 4. This enables the computation control unit 32 to appropriately determine whether the vehicle 10 is stuck in a traffic jam, even when the flow of vehicles differs among lanes. Thus the computation control unit 32 can avoid computation of the classifier from being omitted in a dangerous situation, e.g., when cutting-in occurs frequently because the flow of vehicles differs among lanes or when a person crossing the road may run out into the host vehicle lane.

Alternatively, the computation control unit 32 may determine that the vehicle 10 is stuck in a traffic jam, when the current position of the vehicle 10 measured by the GPS receiver (not illustrated) mounted on the vehicle 10 is included in a congested zone included in traffic information received via the wireless communication terminal (not illustrated) mounted on the vehicle 10. In other words, the computation control unit 32 may determine that the situation around the vehicle 10 corresponds to situation 4.

Regarding situation 5, the computation control unit 32 compares the position of the stopped vehicle 10 with that of a stop line indicated by the map information to determine whether the vehicle 10 is stopped beyond the stop line. In this case, it is necessary to estimate the position of the vehicle 10 with high accuracy. Thus, for example, the computation control unit 32 may compare features represented in an image obtained by the camera 2 with the map information to estimate the position and orientation of the vehicle 10. For example, the computation control unit 32 makes an assumption about the position and orientation of the vehicle 10, and projects features on the road (e.g., road markings such as lane lines or stop lines) detected by the object detection unit 31 from an image obtained from the camera 2 onto a map by referring to internal parameters of the camera 2, or projects features on the road around the vehicle 10 in the map onto the image. Then, the computation control unit 32 may estimate the actual position and orientation of the vehicle 10 to be the assumed position and orientation of the vehicle 10 for the case that the features on the road detected from the image best match with the features on the road represented in the map.

When the position of the front end of the vehicle 10 determined from the estimated stopping position of the vehicle 10 lies ahead of the stop line closest to the vehicle 10 indicated by the map information with respect to the travel direction of the vehicle 10, the computation control unit 32 determines that the vehicle 10 is stopped beyond the stop line. In other words, the computation control unit 32 determines that the situation around the vehicle 10 corresponds to situation 5.

In the case that the camera 2 is provided to capture a region ahead of the vehicle 10, when the vehicle 10 approaches a stop line too much, the stop line will be outside the area to be captured by the camera 2, causing the stop line not to be represented in an image generated by the camera 2. Thus the computation control unit 32 calculates the distance traveled by the vehicle 10 from when, of sequential images obtained by the camera 2 in a preceding predetermined period, the last image is obtained in which a stop line is detected by the object detection unit 31 until the vehicle 10 stops, based on odometry information. Then, when the travel distance is greater than the distance from the vehicle 10 to the road surface at the bottom of the area captured by the camera 2, the computation control unit 32 may determine that the vehicle 10 is stopped beyond the stop line. In other words, the computation control unit 32 may determine that the situation around the vehicle 10 corresponds to situation 5.

Every time it changes the degree of omission of computation, the computation control unit 32 notifies the object detection unit 31 of the changed degree of omission of computation. The object detection unit 31 that has received the changed degree of omission of computation applies it to the object detection process executed on images and ranging signals obtained after this reception.

The driving planning unit 33 generates one or more planned trajectories of the vehicle 10 so that the vehicle 10 will not collide with detected target objects around the vehicle 10. Each planned trajectory is represented as, for example, a set of target positions of the vehicle 10 at points in time from the current time to a predetermined time ahead thereof. For example, the driving planning unit 33 tracks a moving object (e.g., a vehicle), of those target objects around the vehicle 10 detected by the object detection unit 31, as described in relation to the computation control unit 32. The driving planning unit 33 may use the result of tracking by the computation control unit 32. The driving planning unit 33 determines trajectories of vehicles from the result of tracking, and predicts trajectories of the respective vehicles to a predetermined time ahead from the determined trajectories. To this end, the driving planning unit 33 can determine the trajectories of the detected vehicles by estimating the positions of the vehicles at the time of acquisition of each image, using the position and orientation of the vehicle 10, estimated distances to the detected vehicles, and the directions from the vehicle 10 to the vehicles at the time of acquisition of each image; the estimated distances and the directions are indicated in the result of tracking. The position and orientation of the vehicle 10 at the time of acquisition of each image may be estimated by comparing an image obtained by the camera 2 with the map information, as described in relation to situation 5 regarding the computation control unit 32.

Additionally, the driving planning unit 33 can predict trajectories of the vehicles, using, for example, a Kalman filter or a particle filter to execute a tracking process on those estimated positions of the vehicles at the time of acquisition of each image represented by the determined trajectories. For a moving object around the vehicle 10 other than a vehicle (e.g., a pedestrian), the driving planning unit 33 executes a similar process to predict a trajectory of the moving object.

The driving planning unit 33 generates a planned trajectory of the vehicle 10, based on the predicted trajectories of the tracked vehicles or objects, so that a predicted distance between the vehicle 10 and any of the tracked vehicles or objects will be not less than a predetermined distance until a predetermined time ahead.

In the case that a traffic light is detected in a preceding predetermined period in the travel direction of the vehicle 10, the driving planning unit 33 may generate a planned trajectory so as to temporarily stop the vehicle 10, depending on the lighting state of the traffic light. Similarly, in the case that a stop line is detected in a preceding predetermined period on the host vehicle lane, the driving planning unit 33 generates a planned trajectory so as to temporarily stop the vehicle 10 at the position of the stop line. When another vehicle is stopped around the vehicle 10, the driving planning unit 33 may generate a planned trajectory so as to temporarily stop the vehicle 10. Alternatively, the driving planning unit 33 may generate a planned trajectory so as to temporarily stop the vehicle 10 at the location on the planned travel route where the vehicle 10 will turn right or left. Then, when it generates a planned trajectory so as to temporarily stop the vehicle 10, the driving planning unit 33 notifies the computation control unit 32 of information indicating the cause that stops the vehicle 10 on the planned trajectory (e.g., the lighting state of a traffic light, the behavior of another vehicle, or a stop line).

The driving planning unit 33 may generate multiple planned trajectories. In this case, the driving planning unit 33 may select one of the planned trajectories such that the sum of the absolute values of acceleration of the vehicle 10 will be the smallest.

The driving planning unit 33 notifies the vehicle control unit 34 of the generated planned trajectory.

The vehicle control unit 34 controls components of the vehicle 10 so that the vehicle 10 will travel along the received planned trajectory. For example, the vehicle control unit 34 determines the acceleration of the vehicle 10 according to the received planned trajectory and the current speed of the vehicle 10 measured by the vehicle speed sensor (not illustrated), and sets the degree of accelerator opening or the amount of braking so that the acceleration of the vehicle 10 will be equal to the determined acceleration. Then, the vehicle control unit 34 determines the amount of fuel injection according to the set degree of accelerator opening, and outputs a control signal depending on the amount of fuel injection to a fuel injector of the engine of the vehicle 10. Alternatively, the vehicle control unit 34 outputs a control signal depending on the set amount of braking to the brake of the vehicle 10.

When it changes the course of the vehicle 10 in order for the vehicle 10 to travel along the planned trajectory, the vehicle control unit 34 determines the steering angle of the vehicle 10 according to the planned trajectory and outputs a control signal depending on the steering angle to an actuator (not illustrated) that controls the steering wheel of the vehicle 10.

FIG. 7 is an operation flowchart of the vehicle control process including the object detection process and executed by the processor 23. The processor 23 executes the vehicle control process at predetermined intervals in accordance with the operation flowchart illustrated in FIG. 7. In the following operation flowchart, the process of steps S101 to S107 corresponds to the object detection process.

The object detection unit 31 of the processor 23 sets which part of computation by the classifier will be omitted, according to the degree of omission of computation received from the computation control unit 32 (step S101). The object detection unit 31 executes computation by the classifier on an image obtained by the camera 2 or a ranging signal obtained by the range sensor 3 in accordance with the setting of omission to detect target objects around the vehicle 10 (step S102).

The computation control unit 32 of the processor 23 determines whether the speed of the vehicle 10 is not greater than the predetermined speed threshold (step S103). When the speed of the vehicle 10 is greater than the predetermined speed threshold (No in Step S103), the computation control unit 32 sets the degree of omission of computation to the degree such that computation by the classifier will not be omitted because the degree of safety of the vehicle 10 is relatively low (step S104).

When the speed of the vehicle 10 is not greater than the predetermined speed threshold (Yes in Step S103), the computation control unit 32 determines whether the situation around the vehicle 10 corresponds to any of predetermined exceptional conditions (step S105). When the situation around the vehicle 10 corresponds to any of the predetermined exceptional conditions (Yes in Step S105), the computation control unit 32 sets the degree of omission of computation to the degree such that computation by the classifier will not be omitted because the degree of safety of the vehicle 10 is relatively low (step S104). When the situation around the vehicle 10 does not correspond to any of the predetermined exceptional conditions (No in Step S105), the computation control unit 32 sets the degree of omission of computation to the degree such that at least part of computation by the classifier will be omitted because the degree of safety of the vehicle 10 is relatively high (step S106). After step S104 or S106, the computation control unit 32 notifies the object detection unit 31 of the set degree of omission of computation (step S107). The degree of omission of computation notified in step S107 to the object detection unit 31 will be reflected in the next and subsequent object detection processes.

The driving planning unit 33 of the processor 23 tracks the detected target objects, and generates a planned trajectory of the vehicle 10 so that the planned trajectory will be separated more than a predetermined distance from any of trajectories of the target objects predicted based on the result of tracking (step S108). The vehicle control unit 34 of the processor 23 controls the vehicle 10 so that the vehicle 10 will travel along the planned trajectory (step S109). Then, the processor 23 terminates the vehicle control process.

As has been described above, the apparatus for object detection inputs a sensor signal obtained by a sensor mounted on a vehicle into a classifier that has been trained to detect a predetermined detection target object, thereby detecting the predetermined object around the vehicle. To this end, when the speed of the vehicle is not greater than a predetermined speed threshold, the apparatus sets the degree of omission of computation by the classifier so that at least part of computation by the classifier will be omitted. However, even if the speed of the vehicle is not greater than the speed threshold, the apparatus does not omit computation by the classifier when the situation around the vehicle corresponds to a predetermined exceptional situation in which the degree of safety of the vehicle is supposed to be low. In this way, the apparatus can ensure the safety of the vehicle and reduce the amount of computation required to detect an object around the vehicle.

According to a modified example, after it temporarily sets the degree of omission of computation to a degree indicating that at least part of computation by the classifier will be omitted, the computation control unit 32 may determine, based on the result of detection by the object detection unit 31 regarding the state or behavior of a target object that has caused the vehicle 10 to stop, whether the cause has been removed. When the cause has been removed, even if the speed of the vehicle 10 is not greater than the speed threshold, the computation control unit 32 may reset the degree of omission of computation to the degree such that computation by the classifier will not be omitted. Detection of a target object around the vehicle 10 by the object detection unit 31, whose result is used for determining whether the cause of the stop of the vehicle 10 has been removed, is executed by computation of the classifier that is omitted according to the specified degree of omission of computation.

For example, in the case that the cause of the stop of the vehicle 10 is a change in the lighting state of a traffic light ahead of the vehicle 10 to a red light, the computation control unit 32 determines that the cause of the stop of the vehicle 10 has been removed, when it is notified by the object detection unit 31 of a change in the lighting state of the traffic light to a green light. In this case, as described above, the object detection unit 31 inputs only a region in an image representing the traffic light into the classifier to detect a change in the lighting state of the traffic light to a green light. Alternatively, the object detection unit 31 determines that the lighting state of the traffic light is a green light, when the average of hue values of a region in an image representing the traffic light is included in a range corresponding to green. Alternatively, the object detection unit 31 may input an image into the simple classifier to detect a change in the lighting state of the traffic light to a green light.

In the case that the cause of the stop of the vehicle 10 is a stop of another vehicle around the vehicle 10, such as a leading vehicle of the vehicle 10, the computation control unit 32 determines that the cause of the stop of the vehicle 10 has been removed, when it is notified by the object detection unit 31 of detection of the fact that the leading vehicle or another vehicle around the vehicle 10 has started moving. In this case, as described above, the object detection unit 31 detects that the leading vehicle or the other vehicle has started moving, based on a ranging signal from the range sensor 3, without using an image obtained by the camera 2. Alternatively, the object detection unit 31 detects that the leading vehicle or another vehicle around the vehicle 10 has started moving, when the number of blocks whose magnitude of optical flow is not less than a predetermined threshold is not less than a predetermined number, or when optical flow calculated for a region representing the leading vehicle is not less than the predetermined threshold. Alternatively, the object detection unit 31 may detect that the leading vehicle has started moving, when a predetermined position (e.g., the centroid) in the region representing the leading vehicle detected by inputting an image into the simple classifier or the size of this region has changed by a predetermined threshold or more from the predetermined position or the size thereof at the time of the stop of the vehicle 10.

According to another modified example, the computation control unit 32 may set the degree of omission of computation by the classifier to one of three or more degrees. In this case, the computation control unit 32 may set the degree of omission of computation so that the slower the speed of the vehicle 10, the more the computation will be omitted. For example, when the speed of the vehicle 10 is not greater than the predetermined speed threshold but the vehicle 10 is not stopped, the computation control unit 32 sets the degree of omission of computation so that only one of the above-described techniques to omit computation will be applied. When the vehicle 10 is stopped, the computation control unit 32 may set the degree of omission of computation so that two or more of the above-described techniques to omit computation will be applied.

Alternatively, the computation control unit 32 may input an image or a ranging signal into a classifier for setting the degree of omission, which has been trained to determine the degree of omission of computation by the classifier of the object detection unit 31, to set the degree of omission of computation. In this case, the classifier for setting the degree of omission may be, for example, a DNN having a CNN architecture. However, to prevent too much computation from being required to set the degree of omission of computation, the classifier for setting the degree of omission is preferably configured so that the amount of computation thereof will be smaller than that of computation of the classifier of the object detection unit 31. Alternatively, the computation control unit 32 may set the degree of omission of computation in accordance with a condition imposed in a predetermined rule. For example, the computation control unit 32 may set the degree of omission of computation so that the slower the speed of the vehicle 10, the greater the number of applied techniques of the above-described techniques to omit computation. Alternatively, the computation control unit 32 may set the degree of omission of computation so that the slower the speed of the vehicle 10, the longer the cycle in which a sensor signal is inputted into the classifier.

According to still another modified example, in the case that the speed of the vehicle 10 is not greater than the predetermined speed threshold, even if the situation around the vehicle 10 corresponds to one of the above-described exceptional situations, the computation control unit 32 may set the degree of omission of computation so that part of computation by the classifier will be omitted so as not to affect the safety of the vehicle 10 in the corresponding exceptional situation.

For example, the situation around the vehicle 10 corresponds to the fourth or fifth situation but does not correspond to any of the first to third situations in some cases. More specifically, when the vehicle 10 is stuck in a traffic jam or stopped beyond a stop line but the situation thereof does not correspond to any of the other exceptional situations, the computation control unit 32 may set the degree of omission of computation so that the cycle in which an image or a ranging signal is inputted into the classifier will be longer than the cycle for the case that computation by the classifier is not omitted.

Additionally, the situation around the vehicle 10 corresponds to one of the first or the third to the fifth situations but does not correspond to the second situation in some cases. More specifically, the distance to a predetermined object around the vehicle 10 is greater than the predetermined distance, but the situation around the vehicle 10 corresponds to one of the other exceptional situations in some cases. In this case, the computation control unit 32 may set the degree of omission of computation so that a sensor signal obtained by one of the camera 2 and the range sensor 3 having a shorter sensing range, i.e., by the sensor for sensing an object around the vehicle 10 (e.g., sonar) will not be used for object detection, i.e., so that this sensor signal will not be inputted into the classifier.

Additionally, the situation around the vehicle 10 corresponds to the fifth situation (the situation in which the vehicle 10 is stopped beyond a stop line) but does not correspond to any of the other exceptional situations in some cases. In this case, the computation control unit 32 may set the degree of omission of computation so that only the detection range in an image obtained by the camera 2, i.e., only part of the sensor signal will be inputted into the classifier.

Further, the situation around the vehicle 10 corresponds to the fourth situation (the situation in which the vehicle 10 is stuck in a traffic jam) or the fifth situation but does not correspond to any of the other exceptional situations in some cases. In this case, the computation control unit 32 may set the degree of omission of computation so that part of computation of the classifier itself will be omitted or the simple classifier will be used.

According to yet another modified example, the computation control unit 32 may set the degree of omission of computation by the classifier of the object detection unit 31, based on information indicating the degree of safety of the vehicle 10 other than the speed of the vehicle 10. For example, when the road on which the vehicle 10 is traveling is an expressway and there is no route merging with the road around the current position of the vehicle 10, it is supposed that there is no object entering the course of the vehicle 10 from the side of the vehicle 10. In such a case, the vehicle 10 only needs to follow the leading vehicle, and the degree of safety of the vehicle 10 is higher than in the case that a vehicle may cut in ahead of the vehicle 10, e.g., the case that there is a merging route around the vehicle 10. Thus the computation control unit 32 may set the degree of omission of computation so as to limit the detection range to be inputted into the classifier to the front-back direction of the vehicle 10. In this case, for example, the computation control unit 32 may refer to the position of the vehicle 10 obtained from positioning information received by the GPS receiver and the map information to determine whether the road on which the vehicle 10 is traveling is an expressway and whether there is no route merging with the road around the current position of the vehicle 10. When the vehicle 10 can obtain the result of object detection ahead of the leading vehicle from the leading vehicle by inter-vehicle communication, the computation control unit 32 may set the degree of omission of computation so as to limit the sensor signal to be inputted into the classifier to one representing a region behind the vehicle 10.

A computer program for achieving the functions of the processor 23 of the apparatus for object detection according to the embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for object detection, comprising:
  a processor configured to:
  detect an object around a vehicle by inputting a sensor signal into a classifier, the sensor signal being obtained by at least one sensor mounted on the vehicle for sensing the situation around the vehicle;
  set the degree of omission of computation so that at least part of computation on the sensor signal by the classifier will be omitted when the speed of the vehicle is not greater than a predetermined speed threshold and the situation around the vehicle does not correspond to a first situation in which the number of objects around the vehicle is not less than a predetermined number, a second situation in which the distance between the vehicle and an object around the vehicle is not greater than a predetermined distance, a third situation in which the speed of an object around the vehicle relative to the vehicle is not less than a predetermined threshold, a fourth situation in which the vehicle is stuck in a traffic jam, nor a fifth situation in which the vehicle is stopped beyond a stop line;
  generate a planned trajectory based on an output of the classifier; and
  control the vehicle to travel along the planned trajectory; wherein
  the processor omits part of computation on the sensor signal by the classifier according to the set degree of omission of computation so that a size of a feature map which is calculated by a predetermined layer of the classifier when the computation on the sensor signal by the classifier is omitted is smaller than the size of the feature map when the computation on the sensor signal by the classifier is not omitted; and
  when the speed of the vehicle is not greater than the predetermined speed threshold and the situation around the vehicle corresponds to the fourth or the fifth situation but does not correspond to any of the first to the third situations, the processor sets the degree of omission of computation so that the cycle in which the sensor signal is inputted into the classifier will be longer than the cycle for the case that the speed of the vehicle is greater than the predetermined speed threshold.

2. The apparatus according to claim 1, wherein the at least one sensor comprises a first sensor that outputs a first sensor signal and a second sensor that has a shorter sensing range than the first sensor and that outputs a second sensor signal, and
  when the speed of the vehicle is not greater than the predetermined speed threshold and the situation around the vehicle corresponds to one of the first or the third to the fifth situations but does not correspond to the second situation, the processor sets the degree of omission of computation so that the first sensor signal obtained by the first sensor will be inputted into the classifier and that the second sensor signal obtained by the second sensor will not be inputted into the classifier.

3. The apparatus according to claim 1, wherein when the speed of the vehicle is not greater than the predetermined speed threshold and the situation around the vehicle corresponds to the fifth situation but does not correspond to any of the first to the fourth situations, the processor sets the degree of omission of computation so that only part of the sensor signal corresponding to part of surroundings of the vehicle represented by the sensor signal will be inputted into the classifier.

4. The apparatus according to claim 1, wherein the classifier comprises a first classifier and a second classifier that detects an object around the vehicle with lower accuracy and with a smaller amount of computation than the first classifier, and when the speed of the vehicle is greater than the predetermined speed threshold, the processor sets the degree of omission of computation so that the sensor signal will be inputted into the first classifier; and when the speed of the vehicle is not greater than the predetermined speed threshold and the situation around the vehicle corresponds to the fourth or the fifth situation but does not correspond to any of the first to the third situations, the processor sets the degree of omission of computation so that the sensor signal will be inputted into the second classifier.

5. The apparatus according to claim 1, wherein when the speed of the vehicle is not greater than the predetermined speed threshold and the situation around the vehicle corresponds to the fourth or the fifth situation but does not correspond to any of the first to the third situations, the processor sets the degree of omission of computation so that part of computation of the classifier itself will be omitted.

6. The apparatus according to claim 1, wherein the processor detects the state or behavior of the object around the vehicle, based on the sensor signal obtained after the state or behavior of the object around the vehicle causes the vehicle to stop and thereby the processor sets the degree of omission of computation so that at least part of computation on the sensor signal by the classifier will be omitted, and the processor determines whether the cause of the stop of the vehicle has been removed, based on the detected state or behavior of the object around the vehicle; and when the cause has been removed, even if the speed of the vehicle is not greater than the predetermined speed threshold, resets the degree of omission of computation so that computation on the sensor signal by the classifier will not be omitted.

7. A method for object detection, comprising:
detecting an object around a vehicle by inputting a sensor signal into a classifier, the sensor signal being obtained by at least one sensor mounted on the vehicle for sensing the situation around the vehicle;
setting the degree of omission of computation so that at least part of computation on the sensor signal by the classifier will be omitted when the speed of the vehicle is not greater than a predetermined speed threshold and the situation around the vehicle does not correspond to a first situation in which the number of objects around the vehicle is not less than a predetermined number, a second situation in which the distance between the vehicle and an object around the vehicle is not greater than a predetermined distance, a third situation in which the speed of an object around the vehicle relative to the vehicle is not less than a predetermined threshold, a fourth situation in which the vehicle is stuck in a traffic jam, nor a fifth situation in which the vehicle is stopped beyond a stop line, generating a planned trajectory based on an output of the classifier; and
controlling the vehicle to travel along the planned trajectory;
wherein
detection of the object is executed with part of computation on the sensor signal by the classifier being omitted according to the set degree of omission of computation so that a size of a feature map which is calculated by a predetermined layer of the classifier when the computation on the sensor signal by the classifier is omitted is smaller than the size of the feature map when the computation on the sensor signal by the classifier is not omitted; and
when the speed of the vehicle is not greater than the predetermined speed threshold and the situation around the vehicle corresponds to the fourth or the fifth situation but does not correspond to any of the first to the third situations, the processor sets the degree of omission of computation so that the cycle in which the sensor signal is inputted into the classifier will be longer than the cycle for the case that the speed of the vehicle is greater than the predetermined speed threshold.

8. A non-transitory recording medium that stores a computer program for object detection, the computer program causing a processor mounted on a vehicle to execute a process comprising:
detecting an object around the vehicle by inputting a sensor signal into a classifier, the sensor signal being obtained by at least one sensor mounted on the vehicle for sensing the situation around the vehicle;
setting the degree of omission of computation so that at least part of computation on the sensor signal by the classifier will be omitted when the speed of the vehicle is not greater than a predetermined speed threshold and the situation around the vehicle does not correspond to a first situation in which the number of objects around the vehicle is not less than a predetermined number, a second situation in which the distance between the vehicle and an object around the vehicle is not greater than a predetermined distance, a third situation in which the speed of an object around the vehicle relative to the vehicle is not less than a predetermined threshold, a fourth situation in which the vehicle is stuck in a traffic jam, nor a fifth situation in which the vehicle is stopped beyond a stop line;
generating a planned trajectory based on an output of the classifier; and
controlling the vehicle to travel along the planned trajectory; wherein
detection of the object is executed with part of computation on the sensor signal by the classifier being omitted according to the set degree of omission of computation so that a size of a feature map which is calculated by a predetermined layer of the classifier when the computation on the sensor signal by the classifier is omitted is smaller than the size of the feature map when the computation on the sensor signal by the classifier is not omitted; and
when the speed of the vehicle is not greater than the predetermined speed threshold and the situation around the vehicle corresponds to the fourth or the fifth situation but does not correspond to any of the first to the third situations, the processor sets the degree of omission of computation so that the cycle in which the sensor signal is inputted into the classifier will be longer than the cycle for the case that the speed of the vehicle is greater than the predetermined speed threshold.

* * * * *